Patented Aug. 29, 1933

1,924,664

UNITED STATES PATENT OFFICE 1,924,664

PRODUCTION OF ANTHRAQUINONE DERIVATIVES

Robert Fraser Thomson and Rhys Jenkin Loveluck, Grangemouth, Scotland, assignors to Imperial Chemical Industries Limited, a corporation of Great Britain No Drawing. Application September 30, 1932, Serial No. 635,608, and in Great Britain October 22, 1931

19 Claims. (Cl. 260—60)

This invention relates to the production of anthraquinone derivatives.

It is an object of this invention to provide a novel and efficient process for the manufacture of 1-amino-2-chloro-anthraquinone.

It is a further object of this invention to produce novel intermediate compounds, more particularly, 2-chloro-1-aryl-sulfonamido-anthraquinones, which are adapted to be converted efficiently into 1-amino-2-chloro-anthraquinone by the simple step of hydrolysis.

Other and further important objects of this invention will appear as the description proceeds.

According to our invention 1,2-dichloro-anthraquinone is condensed with an arylsulfonomide, e. g., p-toluenesulfonamide, in the presence of an acid absorber and a copper catalyst under conditions which lead to substantially complete replacement of the α-chloro atom; thus, the condensation may be effected in a medium in which the 2-chloro-1-arylsulfonamido-anthraquinone compound produced is insoluble and is therefore removed from the sphere of action by precipitation. The arylsulfonyl group may be subsequently removed from the product by hydrolysis, e. g. with sulfuric acid, and the hydrolyzed product may be purified by diluting the acid solution somewhat and filtering off precipitated impurities, the filtrate being finally fully diluted to precipitate the desired product.

In a preferred form of our invention 1,2-dichloro-anthraquinone is condensed with p-toluenesulfonamide in the presence of potassium carbonate and cuprous chloride in o-dichloro-benzene at a temperature between 170° C. and the boiling point of the mixture, whereby after hydrolysis with 100% sulfuric acid and dilution to 70–80% acid, filtration at 80° C., drowning in water and again filtering, there is obtained 2-chloro-1-amino-anthraquinone of high purity in substantially quantitative yield.

It will be understood, however, that this invention is susceptible of wide variations and modifications without departing from the spirit thereof.

The invention is illustrated but not limited by the following examples, in which the parts are by weight.

Example 1

60 parts of 1,2-dichloro-anthraquinone are dissolved in 300 parts of o-dichlorobenzene at the boil. 46 parts of potassium carbonate (99–100%), 0.6 parts of copper acetate and 0.9 parts of cuprous chloride are then added, and finally while still boiling gently, 60 parts of p-toluenesulfonamide are added in small portions at a time during three hours. At the end of this time the temperature is kept between 174–178° C. for 15 hours. The product is allowed to cool somewhat, steamed to remove the o-dichlorobenzene, filtered, and the residue washed with water and dried.

Example 2

86 parts of the product of Example 1 are added to 350 parts of 100% sulfuric acid, mixed cold and heated to 100° C. for one hour. The temperature is then let down to 80° C.; sufficient water is added to reduce the acid strength to 80% sulfuric acid, and the mixture is filtered at 80° C. The filtrate is poured into an excess of water and the 2-chloro-1-amino-anthraquinone is obtained in very good purity and almost theoretical yield. The filtration at 80° C. removes traces of unchanged 1,2-dichloro-anthraquinone if these are present.

Example 3

40 parts of 1,2-dichloro-anthraquinone are dissolved in 300 parts of o-dichlorobenzene at the boil. 40 parts of potassium carbonate (99–100%), 0.4 parts of copper acetate and 0.6 parts of cuprous chloride are added, followed by 40 parts of o-toluenesulfonamide in small portions over 3 hours. The temperature is then kept at 174–178° C. for 12 hours and then steamed to remove o-dichlorobenzene. The solid is isolated by filtration, washed thoroughly with water and dried. Yield—60 parts.

Example 4

30 parts of the product of Example 3 are dissolved in 120 parts of 97% sulfuric acid in the cold and heated to 100° C. for 1 hour. The temperature is lowered to 80° C. and the charge diluted to 70% sulfuric acid by the addition of 46 parts of water, and the mixture filtered at 80–85° C. The residue consists of a small amount of unchanged 1,2-dichloro-anthraquinone. The filtrate is poured into excess water and the 2-chloro-1-amino-anthraquinone isolated by filtration, washing and drying. Yield—18 parts.

Having now particularly described and ascertained the nature of our said invention, and in what manner the same is to be performed, we declare that what we claim is:

1. A process for producing 1-amino-2-chloro-anthraquinone which comprises reacting upon 1,2-dichloro-anthraquinone with an aryl-sulfonamide to produce 1-arylsulfonamido-2-chloro-anthraquinone, and hydrolyzing the latter to split off the aryl-sulfonyl group.

2. A process for producing 1-amino-2-chloro-anthraquinone which comprises reacting upon 1,2-dichloro-anthraquinone with an aryl-sulfonamide in a medium in which the resulting 1-arylsulfonamido-2-chloro-anthraquinone is insoluble, recovering the latter and reacting upon the same with concentrated sulfuric acid to split off the aryl-sulfonyl group.

3. A process for producing 1-amino-2-chloro-anthraquinone which comprises reacting upon 1,2-dichloro-anthraquinone with an aryl-sulfonamide in a medium in which the resulting 1-arylsulfonamido-2-chloro-anthranquinone is insoluble, recovering the latter, reacting upon the same with concentrated sulfuric acid, and finally recovering the 1-amino-2-chloro-anthraquinone formed by successive dilution and filtering.

4. A process for producing 1-amino-2-chloro-anthraquinone which comprises reacting upon 1,2-dichloro-anthraquinone with an aryl-sulfonamide in a medium in which the resulting 1-arylsulfonamido-2-chloro-anthraquinone is insoluble, recovering the latter, reacting upon the same with concentrated sulfuric acid, and drowning the reaction mass in water to precipitate 1-amino-2-chloro-anthraquinone.

5. In the process of preparing 1-amino-2-chloro-anthraquinone, the step which comprises reacting upon 1,2-dichloro-anthraquinone with an aryl-sulfonamide to produce 1-arylsulfonamido-2-chloro-anthraquinone.

6. In the process of preparing 1-amino-2-chloro-anthraquinone, the step which comprises reacting upon 1,2-dichloro-anthraquinone with a toluene-sulfonamide to produce 1-toluenesulfonamido-2-chloro-anthroquinone.

7. In the process of preparing 1-amino-2-chloro-anthraquinone, the step which comprises reacting upon 1,2-dichloro-anthraquinone with p-toluene-sulfonamide to produce 1-p-toluene-sulfonamido-2-chloro-anthraquinone.

8. In the process of preparing 1-amino-2-chloro-anthraquinone, the step which comprises reacting upon 1,2-dichloro-anthraquinone with o-toluene-sulfonamide to produce 1-o-toluene-sulfonamido-2-chloro-anthraquinone.

9. The process of preparing a 1-arylsulfonamido-2-chloro-anthraquinone which comprises reacting 1,2-dichloro-anthraquinone with an aryl-sulfonamide in a medium in which the resulting compound is insoluble.

10. The process of preparing a 1-arylsulfonamido-2-chloro-anthraquinone which comprises reacting 1,2-dichloro-anthraquinone with an aryl-sulfonamide in the presence of an acid absorber and a copper catalyst and in a medium in which the resulting compound is insoluble.

11. The process of preparing a 1-toluenesulfonamido-2-chloro-anthraquinone which comprises reacting 1,2-dichloro-anthraquinone with a toluene-sulfonamide in a medium of o-dichlorobenzene and in the presence of an acid absorber and a copper catalyst.

12. The process of preparing 1-p-toluenesulfonamido-2-chloro-anthraquinone which comprises reacting 1,2-dichloro-anthraquinone with p-toluene-sulfonamide in o-dichlorobenzene in the presence of an alkali-metal carbonate and a cuprous salt.

13. The process of preparing 1-o-toluenesulfonamido-2-chloro-anthraquinone which comprises reacting 1,2-dichloro-anthraquinone with o-toluene-sulfonamide in o-dichlorobenzene in the presence of an alkali-metal carbonate and a cuprous salt.

14. As a new compound, a 1-arylsulfonamido-2-chloro-anthraquinone.

15. As a new compound, a 1-toluenesulfonamido-2-chloro-anthraquinone.

16. As a new compound, 1-p-toluenesulfonamido-2-chloro-anthraquinone.

17. As a new compound, 1-o-toluenesulfonamido-2-chloro-anthraquinone.

18. In the process of producing 1-amino-2-chloro-anthraquinone by the hydrolysis of a 1-arylsulfonamido-2-chloro-anthraquinone in a medium of concentrated sulfuric acid, the step which comprises diluting the reaction mass to a point where the 1-amino-2-chloro-anthraquinone is substantially soluble while the impurities are substantially insoluble, separating the clear solution from the precipitated impurities, and diluting the solution further, to precipitate 1-amino-2-chloro-anthraquinone.

19. In the process of producing 1-amino-2-chloro-anthraquinone by the hydrolysis of a 1-arylsulfonamido-2-chloro-anthraquinone in a medium of concentrated sulfuric acid, the step which comprises diluting the reaction mass to about 70-80% acid concentration, separating any precipitate formed, drowning the clear solution in water, and recovering the precipitated 1-amino-2-chloro-anthraquinone.

ROBERT FRASER THOMSON.
RHYS JENKIN LOVELUCK.